(12) United States Patent
Ladet et al.

(10) Patent No.: US 8,615,843 B2
(45) Date of Patent: Dec. 31, 2013

(54) POWERED OPERATION DEVICE FOR A GLOVE BOX AND GLOVE BOX EQUIPPED WITH SUCH A DEVICE

(75) Inventors: Xavier Ladet, Cairanne (FR); Jean-Pierre Alanore, Tresques (FR); Patrick Bolcato, Bollene (FR)

(73) Assignees: S.T.M.I. Societe des Techniques en Milieu Ionisant, Gif-sur-Yvette (FR); Compagnie Generale des Matieres Nucleaires, Velizy-Villcoublay (FR)

( * ) Notice: Subject to any disclaimer, the term of this patent is extended or adjusted under 35 U.S.C. 154(b) by 1647 days.

(21) Appl. No.: 11/793,876

(22) PCT Filed: Dec. 16, 2005

(86) PCT No.: PCT/FR2005/051096
§ 371 (c)(1),
(2), (4) Date: Jun. 21, 2007

(87) PCT Pub. No.: WO2006/090036
PCT Pub. Date: Aug. 31, 2006

(65) Prior Publication Data
US 2008/0079336 A1    Apr. 3, 2008

(30) Foreign Application Priority Data
Dec. 21, 2004   (FR) .................................. 04 53123

(51) Int. Cl.
*A47L 5/38*   (2006.01)
(52) U.S. Cl.
USPC .............................................. 15/301; 15/313

(58) Field of Classification Search
USPC ...................... 15/313, 314, 301, 330, 250.22
See application file for complete search history.

(56) References Cited

U.S. PATENT DOCUMENTS

| | | | |
|---|---|---|---|
| 3,688,081 A * | 8/1972 | Speich | 219/203 |
| 4,536,064 A * | 8/1985 | Schindel et al. | 359/508 |
| 6,730,867 B2 * | 5/2004 | Hyp | 200/318 |
| 7,086,118 B2 * | 8/2006 | Engel et al. | 15/340.4 |
| 7,152,272 B2 * | 12/2006 | Rukavina et al. | 15/313 |
| 2004/0163203 A1 * | 8/2004 | Wang | 15/344 |

FOREIGN PATENT DOCUMENTS

| | | |
|---|---|---|
| EP | 0504013 | 9/1992 |
| FR | 2351306 | 12/1977 |
| FR | 2 652 143 | 3/1991 |
| FR | 2 746 328 | 9/1997 |
| FR | 2759619 | 8/1998 |

OTHER PUBLICATIONS

International Seach Report, PCT/FR2005/051096, 2 pgs, (Mar. 27, 2006).

* cited by examiner

*Primary Examiner* — Dung Van Nguyen
(74) *Attorney, Agent, or Firm* — Nixon Peabody LLP

(57) ABSTRACT

A powered operation device for a glove box in a particular application to the field of nuclear fuel manufacturing. The device including a receiving portion designed to be driven by a motor part. The receiving portion has primary attachment means designed so as to enable this receiving portion to be mounted inside the glove box on a docking cylinder provided on the latter, and the motor part has secondary attachment means designed so as to enable this motor part to be mounted on the same docking cylinder, but outside the glove box.

16 Claims, 2 Drawing Sheets

POWERED OPERATION DEVICE FOR A GLOVE BOX AND GLOVE BOX EQUIPPED WITH SUCH A DEVICE

CROSS REFERENCE TO RELATED APPLICATIONS OR PRIORITY CLAIM

This application is a national phase of International Application No. PCT/FR2005/051096 entitled "Powered Operation Device For A Glove Box And Glove Box Equipped With Same", which was filed on Dec. 16, 2005, which was not published in English, and which claims priority of the French Patent Application No. 04 53123 filed Dec. 21, 2004.

TECHNICAL FIELD

The present invention generally relates to the field of glove boxes defining confinement enclosures, as well as to powered operation devices intended to operate inside these glove boxes.

The invention is therefore likely to find application in any industry using such glove boxes, such as pharmaceutical, chemical, cosmetic, agri-food, etc. industries.

Nevertheless, the present invention finds a most particular but non-restrictive application in the nuclear field, for example in that of handling nuclear powders, notably for making nuclear fuel, such as MOX fuel, or for example in that of cleaning up or dismantling of glove boxes.

The invention also relates to a method for assembling a powered operation device on a glove box having at least one docking cylinder, the powered operation devices for example being of the vacuum cleaner, drill, saw, grinder, chain saw, punch, etc. type.

STATE OF THE PRIOR ART

Glove boxes defining confinement enclosures are widely known in the field of the manufacturing of nuclear fuel, notably within the framework of manufacturing MOX fuel pellets.

These pellets are actually made in a confinement enclosure by assembling powders of plutonium and uranium oxide compressed under very high pressure in suitable gauges, this compression operation being followed by a rectifying operation by dry grinding.

This last operation ineluctably causes the appearance of powder residues in great amounts in the confinement enclosure. Thus, for obvious reasons of quality of the manufactured products, the glove box is usually cleaned between the phases for making pellets with different grades, these cleaning phases also being called <<campaigns between grades>>.

In order to perform the required cleaning, the glove box is equipped with one or more vacuum cleaners firmly and entirely added to the inside of the glove box, which first of all has disastrous consequences by affecting the integrity of this box, by requiring a relatively long setup time, and also by producing significant occupied space inside this glove box.

Moreover, it is noted that the vacuum cleaners, and more particularly the motor part of the latter, have a short lifetime and low reliability because of the abrasive environment prevailing inside the confinement enclosure and produced by the presence of nuclear fuel powders in large amounts, the lifetime and reliability being also changed by the high temperature and the nitrogen atmosphere encountered inside the glove box.

Actually, the high temperature of the order of 40-50° C., implies that the motor part of the vacuum cleaner will tend to overheat rapidly, whereas the abrasive powders inevitably cause short-circuiting of the rotor of this motor part, only after a few hours of operation, or even after a still shorter time.

Consequently, the vacuum cleaners need to be replaced frequently, which simultaneously produces waste in large amounts, a long intervention time and constraining for the operators, of course associated with substantial dosimetry of the latter.

Additionally, another drawback related to this configuration of the prior art is that the vacuum cleaners set up inside the glove box do not provide optimized suction depending of the localization of the powders to be sucked up, unless a suction flexible hose may be used with a consequent length. In this last case, the particularly substantial length of the suction flexible hose then enhances not inconsiderably the volume of waste, and especially represents a drawback in terms of bulkiness and easy handling inside the glove box.

It is pointed out that this suction optimization is also found again when performing operations for cleaning up and dismantling the glove boxes, one is led to sucking up either directly the dusts (comprising the contaminants) or the decontamination products which once they are used, are again found in the dry form, such as the organomineral decontamination gel described in document FR-A-2 746 328.

Finally, it is pointed out that identical or similar drawbacks and possibly other drawbacks, occur when the question is of equipping the glove box with a powered operation device other than a vacuum cleaner, such as for example a drill, a saw, a grinder, a chain saw, or even a punch.

On the other hand, at least one part of the drawbacks mentioned above is naturally found again for glove boxes equipped with such powered operation devices, intended for other types of industries, such as the pharmaceutical, chemical, cosmetic, or even agri-food industries.

OBJECT OF THE INVENTION

Accordingly, the object of the invention is to propose a powered operation device for a glove box as well as a glove box having at least one docking cylinder and being equipped with such a device, this device and this glove box finding at least a partial remedy to the drawbacks mentioned above relating to realizations of the prior art.

Additionally, the object of the invention is also to present a method for assembling such a powered operation device on a glove box.

To do this, the object of the invention first of all, is a powered operation device for a glove box, the device including a receiving portion intended to be driven by a motor part. According to the invention, the receiving portion has primary attachment means designed so as to enable this receiving portion to be mounted inside the glove box on a docking cylinder provided on the latter, and the motor part has secondary attachment means designed so as to enable this motor part to be mounted on this same docking cylinder, outside the glove box.

Further, the object of the invention is also a glove box having at least one docking cylinder designed so as to be able to receive a piece of equipment, the glove box further comprising a powered operation device including a receiving portion capable of being driven by a motor part and intended to operate inside this glove box. According to the invention, the powered operation device, assembled on a docking cylinder of the glove box, is such as the one described above and also object of the present invention.

Thus, in an innovative way, the invention provides direct mounting of a powered operation device on a docking cylinder of a glove box, without requiring modification of the integrity of the relevant docking cylinder, or that of any other constitutive component of the glove box. Indeed, the primary and secondary attachment means providing the mounting of the receiving portion and of the motor part on the docking cylinder, respectively, are specifically designed so as to be able to directly cooperate with complementary means initially provided on this docking cylinder, with a known purpose of enabling other standard components or pieces of equipment to be assembled, such as an internal protective sealed cover or even an outer safety ring.

As the integrity of the glove box is not altered by the mounting of the powered operation device, the time and the difficulty for mounting this device are advantageously reduced.

Moreover, it should be understood that the motor part of the device is no longer located inside the glove box, but entirely outside the latter, which implies that advantageously, it is no longer submitted to the restrictive internal conditions such as high temperature, a nitrogen atmosphere, or even the abrasive environment from the presence of powders in large amounts.

Naturally, this specificity generates a significant increase in the lifetime and reliability of the motor part, and more globally of that of the whole powered operation device. Further, this improvement also causes a reduction in the volume of waste, a significant reduction in the intervention time related to changes of the powered devices, and, consequently, a non-negligible drop in the dosimetry associated with the operators.

Additionally, as the motor part is no longer located in the confinement enclosure, its bulkiness and its cooling are then no longer major problems, so that, consequently, making this motor part in a much more voluminous version as before to increase its performances, may easily be contemplated. Thus, by having higher power, when the powered operation device is a vacuum cleaner, the duration of the <<campaigns between grades>> aiming at cleaning up the glove box, may then be considerably reduced, which also contributes advantageously to reducing dosimetry of the operators.

In a way known to one skilled in the art, standard glove boxes are generally provided with a plurality of identical or similar docking cylinders, which implies that the powered operation device may alternately be mounted on each of this plurality of docking cylinders.

Thus, when the powered operation device is a vacuum cleaner, it is also easily possible to produce optimized suction of the powders without however requiring a flexible hose of substantial length, but quite simply by selecting the docking cylinder supporting the vacuum cleaner according to the specific localization of the powders located inside the glove box.

Further, as assembling/disassembling the motor part and the receiving portion is easy and fast to apply, the vacuum cleaner may thereby easily be moved from one docking cylinder to another, several times during a same <<campaign between grades>>, always with the purpose of optimizing suction according to the localization of the powders.

Preferentially, the powered operation device is such that the primary attachment means comprise screws intended to cooperate with tapped holes provided on an inner flange supporting the docking cylinder, and the secondary attachment means comprise a bracket equipped with projections intended to cooperate with ramps provided on the docking cylinder, so as to allow an attachment of the bayonet type.

In other words, the receiving portion will be attached on the tapped holes initially provided on the inner flange supporting the docking cylinder, actually these holes being originally provided mainly for enabling an internal protective sealed cover to be installed, intended to prevent a flexible piece of equipment housed in the relevant cylinder, such as a glove, from being sucked up inside the glove box under a negative pressure. The internal protective sealed cover, also said to be a <<removable cover>>, which is therefore not mounted when the powered operation device is assembled on the docking cylinder, is usually jointed on a hinge screwed into a first group of aforementioned tapped holes, and may be locked by means of a closing latch which, as for it, is screwed on a second group of aforementioned tapped holes, the holes of the first and the second group are generally diametrically opposite on the inner supporting flange.

More specifically, it is preferably provided that the primary attachment means further comprise two cleats intended to be mounted on the inner flange supporting the docking cylinder via screws and tapped holes mentioned above, as well as knurled screws intended to provide the assembling of a case of the receiving portion, on the cleats.

As regards the motor part, the secondary attachment means will therefore be attached on the ramps initially provided on the docking cylinder, actually these ramps being originally provided mainly for enabling an external safety ring to be installed intended to provide support upon extraction of the piece of equipment housed in the docking cylinder, or further for enabling an ejection cannon to be coupled with the relevant cylinder. In each of these two cases, by the helicoidal ramps with anti-rotation stops, it is possible to provide an attachment of the bayonet type between the docking cylinder and the component which is coupled with it, these couplings of course not being possible when the motor part is assembled on the relevant cylinder.

In view to the foregoing, it may be realized that the proposed powered operation device is quite suitable for being assembled on docking cylinders of the <<LA CALHENE>> (registered trademark) type, an exemplary embodiment of which is notably described in FR-A-2 652 143.

Typically, these docking cylinders actually have helicoidal ramps so as to establish bayonet connections, as well as tapped holes such as those discussed above, and therefore do not require any geometrical modification in order to receive the powered operation device, object of the present invention.

Preferably, the device is with a magnetic drive. It may then be provided that the motor part includes a drive plate provided with permanent magnets, and that the receiving portion includes a receiving plate also provided with permanent magnets, the permanent magnets then being preferably positioned radially on their respective plates, i.e., <<as a ring>>.

In this way, during operation, with the plates positioned facing each other and separated by the piece of equipment housed in the docking cylinder, a satisfactory contactless drive may be provided without altering the existing confinement or requiring modification of the initial geometry of the glove box.

Moreover, the powered operation device mounted on the docking cylinder guarantees permanency of the originally prevailing safety and security conditions.

As mentioned earlier, the device may be a vacuum cleaner thereby implying that the receiving portion is a suction spiral object provided with a tubular sleeve for connection with a suction flexible hose.

Thus, when the powered operation device is assembled on the glove box, the receiving portion and the motor part are actually separated by a piece of equipment mounted on the docking cylinder, this piece of equipment preferably being a window or a solid sealed cover.

Still preferentially, the glove box includes a plurality of docking cylinders, each alternately being capable of receiving the powered operation device. As this emerges clearly from what was pointed out earlier, in the case when the device assumes the form of a vacuum cleaner, the fact of being able to alternately mount the latter on different docking cylinders, enables the whole of the volume of the confinement enclosure defined by the glove box, to be properly explored, and therefore the suction of the powders may be highly optimized during <<campaigns between grades>>. As such, it is specified that the simultaneous mounting of several operation devices on various docking cylinders, might naturally also be contemplated without departing from the scope of the invention.

The glove box which is for example intended to operate under a negative pressure, finds particular application in the field of manufacturing nuclear fuel, but it may also be applied to other types of industries, such as the pharmaceutical, chemical, cosmetic or even agri-food industries, etc.

In the same way, if the vacuum cleaner is a preferential embodiment for the powered operation device, the latter may also assume the form of a drill, a saw, a grinder, a chain saw, a punch or any other powered device likely to be required inside a glove box.

Finally, the object of the invention is also a method for assembling the powered operation device on a glove box having at least one docking cylinder designed so as to be able to receive a piece of equipment. According to the invention, this method comprises the following steps:

introducing the receiving portion of the powered operation device inside the glove box;
  mounting the receiving portion on a docking cylinder of the glove box; and
  mounting on the outside of the glove box, the motor part on the docking cylinder.

Other advantages and features of the invention will become apparent in the non-limiting detailed description below.

BRIEF DESCRIPTION OF THE DRAWINGS

This description will be made with reference to the appended drawings wherein.

DETAILED DESCRIPTION OF PREFERRED EMBODIMENTS

Figure 1:
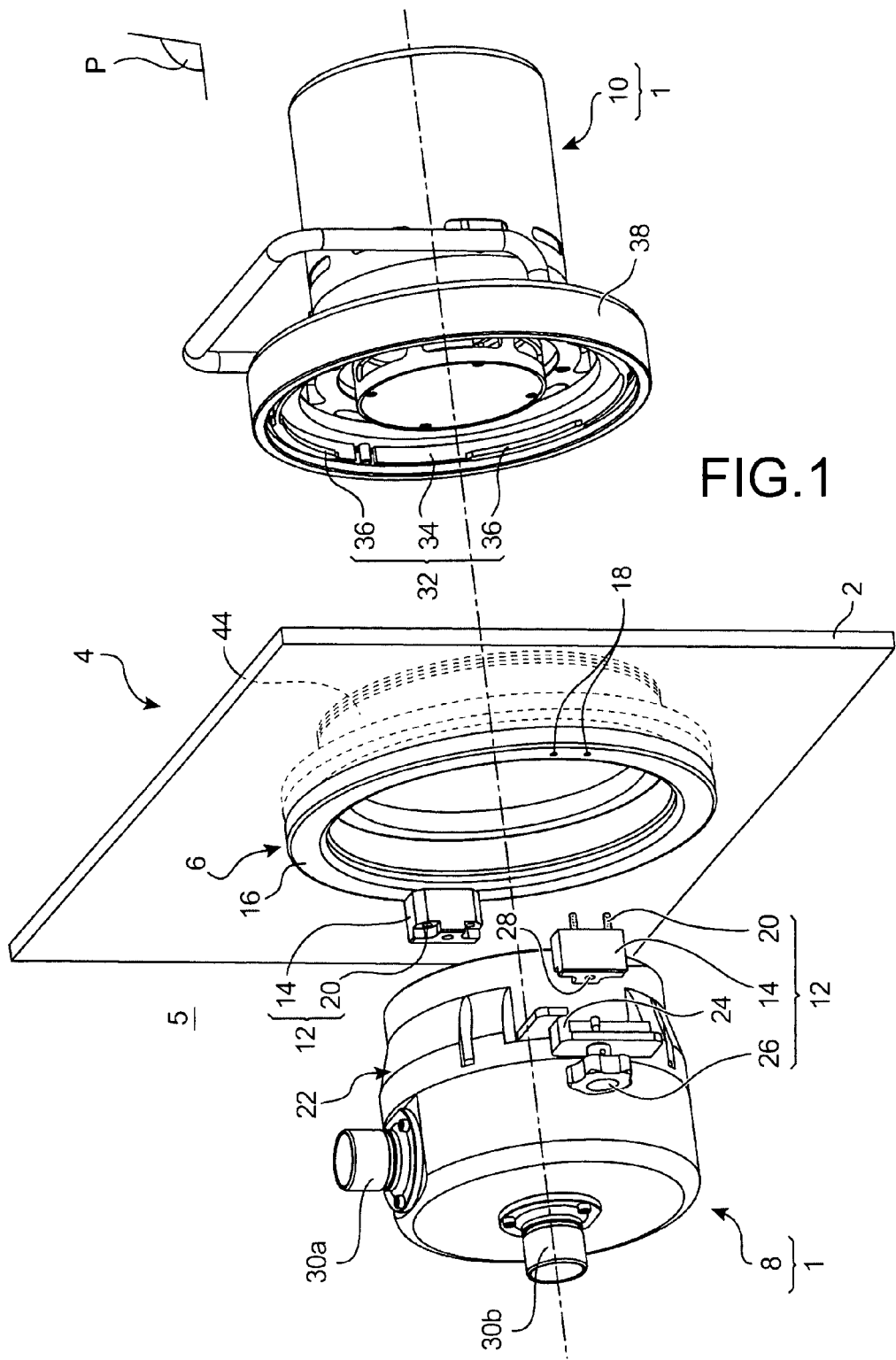
FIG. 1 illustrates a perspective view of a powered operation device according to a preferred embodiment of the present invention, before its installation on a glove box, only illustrated in a very partial way.

First of all with reference to FIG. 1 showing a powered operation device 1 appearing as a preferred embodiment of the present invention, a portion of a wall 2 may also be seen which belongs a glove box 4, also object of the invention, and able to operate under negative pressure.

The wall portion 2 of the glove box 4, which defines a confinement enclosure 5, includes a docking cylinder 6 of the LA CALHENE (registered trademark) type, capable of receiving known equipment such as a glove, a window, a bag, a solid sealed cover, etc. Of course, if a single docking cylinder 6 is visible in FIG. 1, it should be understood that the glove box 4 in reality has a plurality of identical or similar docking cylinders, the number of which depends on size of this glove box 4. Further, the glove box is also likely to include any other standard equipment and known to one skilled in the art, such as one or several airlocks.

In this preferred embodiment where the glove box 4 is intended for manufacturing nuclear fuel and where the powered operation device 1 is a vacuum cleaner, it is pointed out that the latter globally appears as two distinct portions 8, 10 with a contactless drive, and preferably with a magnetic drive.

Actually, the vacuum cleaner 1 comprises a receiver portion 8 or a suction spiral object intended to be mounted in the confinement enclosure 5 on the docking cylinder 6, as well as a motor part 10 intended to be mounted on the same cylinder 6, but outside the glove box.

To do this, the receiving portion 8 includes primary attachment means 12 first of all having two cleats 14 (only one being shown in a fixed position in FIG. 1), which are each intended to be assembled by screwing on the docking cylinder 6, and more specifically on an inner supporting flange 16 of the latter, this flange 16 being actually sealably supported on an inner surface of the wall 2, preferably made in Lexan (registered trademark).

As the supporting flange 16 is initially provided with four tapped holes 18 distributed in two groups of two, positioned diametrically opposite on this flange 16, both cleats 14 may then be easily mounted on the latter, each by means of two screws 20 provided for this purpose and also belonging to the primary attachment means 12.

A case 22 of the receiving portion 8 has two also diametrically opposite lugs 24 (only one being always visible for reasons of perspective), each lug 24 being designed so as to be able to supported flat on an upper portion and on a front portion of an associated cleat 14, for the purpose of providing proper positioning of this receiving portion 8 relatively to the docking cylinder 6.

In order to firmly attach these lugs 24 on the cleats 14, the primary attachment means 12 further include two unlosable knurled screws 26 respectively associated with two diametrically opposite cleats 14, each unlosable knurled screw 26 passing through a lug 24 and being intended to cooperate with a tapped hole 28 made on the associated cleats 14.

Still as regards the receiving portion 8, it is noted that the latter preferably has two tubular sleeves 30a, 30b which are for example assembled by screwing on the case 22, and they are respectively intended for blowing and sucking.

Depending on the selected profile, a suction flexible hose (not shown) is connected to the inside of the glove box 4 on the sleeve 30b with the purpose of being able to proceed, during <<campaigns between grades>>, with cleaning up this box 4 by sucking up the powders contained in the confinement enclosure 5. As such, it is pointed out that the suction spiral object 8 is preferentially connected downstream to a cyclone decanter pot or to any filter for recovering the dusts and other particles.

Moreover, the motor part 10 of the vacuum cleaner 1 includes secondary attachment means 32 mainly provided with a bracket 34 equipped with four projections 36 intended to respectively cooperate with four helicoidal bayonet ramps with anti-rotation stops (not shown in FIG. 1 and referenced as 47 in FIG. 2), these ramps globally arranged around a same circle, being preferably machined at the end of the docking cylinder 6. Of course, the aforementioned projections and ramps may be provided in a number less than or larger than four.

In this way, the four helicoidal ramps as well as the four projections 36 positioned symmetrically and each substantially assuming the form of an annular portion, may provide an attachment of the bayonet type between the motor part 10 and the docking cylinder 6 by performing simple manual rotation of the latter, exactly in the same way as the attachment known to one skilled in the art of an outer security ring on this same cylinder 6 is obtained.

Additionally, the motor part 10 comprises a ring-shaped end portion 38 intended to conform with the outer surface of an outer cylindrical portion 44 of the docking cylinder 6, with the obvious purpose of providing proper positioning of this motor part relatively to the docking cylinder 6. Further, the ring-shaped end portion 38 is positioned coaxially with the bracket 34 and around and at a distance from the latter, as this is better visible in FIG. 2 which will now be described. Moreover, the annular space located between the end portion 38 and the bracket 34 is then intended to receive the outer annular end of the docking cylinder 6.

Figure 2:
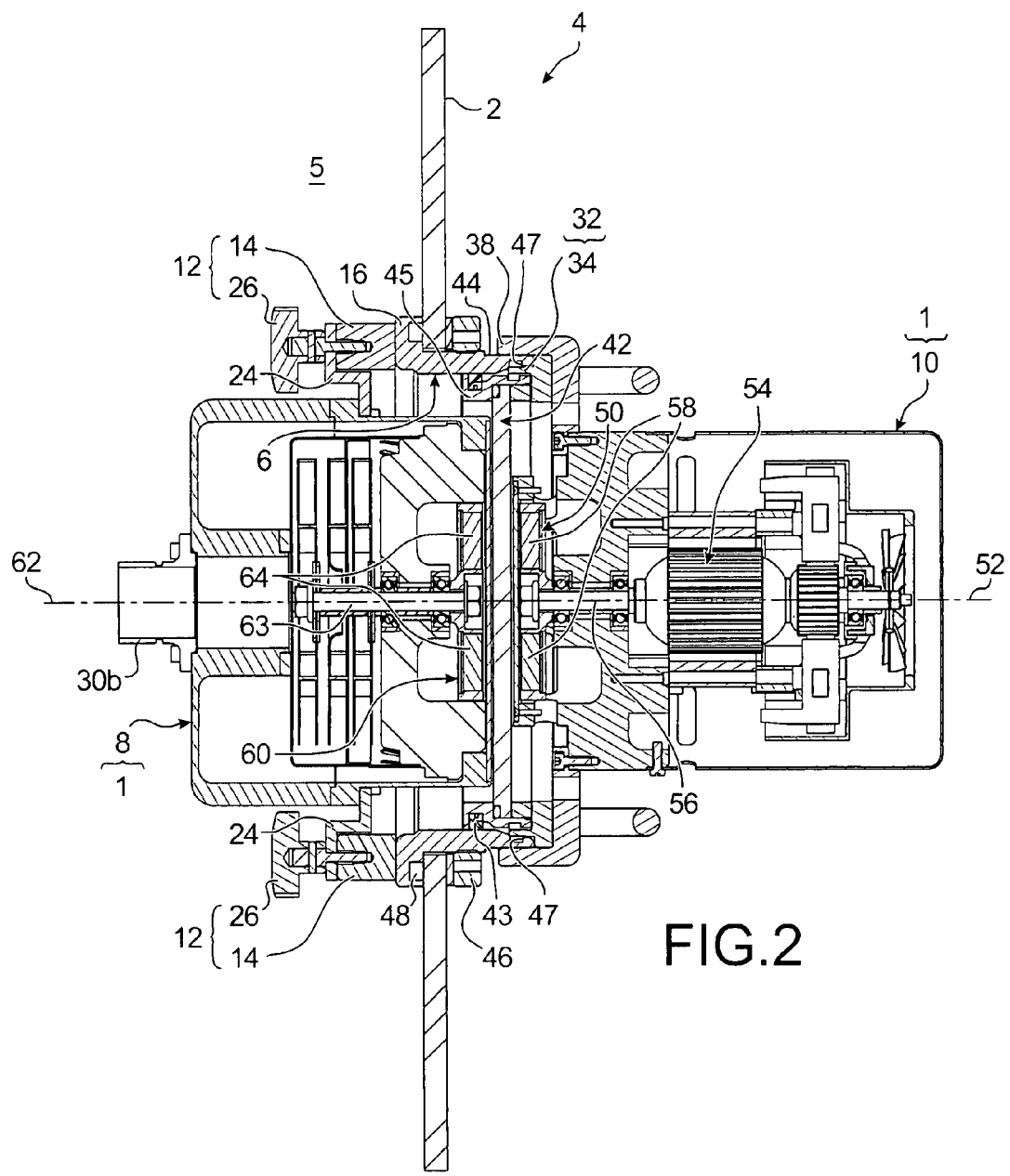
FIG. 2 illustrates a sectional view taken along the plane P of FIG. 1, when the powered operation device is assembled on the glove box.

Accordingly with reference to FIG. 2 illustrating a sectional view along the plane P of FIG. 1, as this horizontal plane P diametrically crosses the vacuum cleaner 1 so as to cut both cleats 14, this vacuum cleaner 1 may be seen in a configuration mounted on the glove box 4.

Thus, when the vacuum cleaner 1 equips the glove box 4, it is first of all specified that the receiving 8 and motor 10 portions are separated by a piece of equipment 42 housed in the relevant docking cylinder 6, this piece of equipment 42 being of the window or solid sealed cover type.

The piece of equipment 42 is held in the cylinder 6 in a way known to one skilled in the art, i.e., notably by means of a lip gasket 43 providing the double function of a static seal in the working position and of a dynamic seal in the case of an initial setup by means of an injection cannon, as well as by means of a flange 45 which will be tightened inside a groove machined in the cylinder 6.

On the other hand, it is recalled that holding the stainless steel docking cylinder 6 on the wall 2 of the glove box 4 is carried out by means of the inner supporting flange 16, as well as by a screw 46 screwed on the outside of the confinement enclosure 5 and providing the crushing of an O-ring gasket 48 arranged in a groove provided on this same inner supporting flange 16.

In order to achieve a contactless drive for the receiving portion 8 by means of the motor part 10, one resorts to magnetism of natural origin, i.e., permanent magnets.

Thus, the motor part 10 includes a drive plate 50 positioned perpendicularly to the axis of rotation 52 as well as to the output shaft 56 of the motor 54, this plate 50 being provided with permanent magnets 58 positioned radially, i.e., as a crown. As an non-limiting example, the permanent magnets 58 are four in number and positioned on the drive plate 50 symmetrically.

In the same way, the receiving portion 8 includes a receiving plate 60 positioned perpendicularly to the axis of rotation 62 and to the output shaft 63 of the spiral object, this plate 60 being also provided with permanent magnets 64 positioned radially. Here again, the permanent magnets 64 are four in number and positioned on the drive plate 60 symmetrically. Of course, the magnets 58, 64 may be provided in a number less than or larger than four, without departing from the scope of the invention.

Therefore, it may be realized that the drive plate 50 is facing the outer surface of the window 42, whereas the receiving plate 60 faces the inner surface of this same window 42, implying that both plates 50, 60 are facing each other and parallel with each other.

Of course, when the vacuum cleaner 1 is assembled in the illustrated way in FIG. 2, the distance separating both plates 50, 60 is such that power transmission may be achieved through the wall of the window 42, via the magnetic flux.

As an indication, it is noted that the receiving plate 60 may be protected by any means so that it may easily be cleaned by the operator.

Further, as regards the motor part 10 of the vacuum cleaner 1, the latter portion is equipped with an electronic system associated with the motor 54. With this system, it is possible to protect the motor 54 against any electrical damage, but it especially allows the latter to be gradually started up. With a variable potentiometer, it is then possible to adapt the rotational speed of the motor 54 and thereby the flow rate and the velocity of the gaseous vein generated by the suction spiral object 8. With this possibility, it is advantageously possible to select the grain size of the material to be sucked up, and thereby provides dissociation between fine dusts, fragments and debris of larger size.

In order to achieve the assembling of the powered operation device 1, a method according to a preferred embodiment of the present invention first of all consists of selecting the docking cylinder 6 for supporting this device 1 from the multitude of cylinders present on the glove box 4, this selection for example being performed according to the localization of the powders to be sucked up.

Next, a piece of equipment 42 of the window or solid sealed cover type is housed in the docking cylinder 6 retained by means of an ejection cannon, whereby this operation of course is only carried out when such a piece of equipment is not already present in this location.

Subsequently, one proceeds with introducing the receiving portion 8 inside the glove box 4, via standard means known to one skilled in the art, such as an airlock.

The cleats 14 are then screwed on the tapped holes 18 of the inner supporting flange 16, so that the fixing screws 20 do not protrude from these same cleats 14, which may then permanently remain on the docking cylinder 6.

The cleats 14 having now been installed, it is then sufficient to properly position both lugs 24 of the case 22 against the cleats 14 and then screw the knurled screws 26 into the tapped holes 28 of the cleats 14. Thus, by screwing the knurled screws 26 passing through the lugs 24, a rigid mechanical assembly of the receiving portion 8 on the docking cylinder 6 may be obtained.

Naturally, the whole of the operations related to installing the receiving portion 8 are carried out manually by an operator located on the outside of the glove box 4, and for example using one or more gloves equipping docking cylinders of this same box 4.

For applying the operation for mounting the motor part 10, firstly, one must be sure that the outer security ring associated with the piece of equipment 42 is removed. When this is the case, the helicoidal ramps 47 of the docking cylinder 6 are free, and so the bracket 34 of the motor part 10 may be attached by simply rotating the latter, this is preferably performed by an operator located outside the glove box.

Finally, it is pointed out that the mounting order between the receiving portion 8 and the motor part 10 may be reversed relatively to the one discussed above, without departing from the scope of the invention.

Of course, various changes may be made by one skilled in the art to the powered operation device 1, to the glove box 4 as well as to the assembling method, which have just been described, only as non-limiting examples.

The invention claimed is:

1. A glove box having at least one docking cylinder designed so as to be able to receive a piece of equipment, said glove box comprising:
   a powered operation device including a receiving portion located inside said glove box, wherein the receiving portion is driven by a motor part, wherein the receiving portion and the motor part of said powered operation device are coupled to a docking cylinder of said glove box, wherein the piece of equipment is held in the docking cylinder in a fixed position and separates the receiving portion and the motor part, and wherein a contactless drive is located between the receiving portion and the motor part.

2. The glove box according to claim 1, characterized in that said receiving portion and said motor part are separated by a piece of equipment mounted on said docking cylinder.

3. The glove box according to claim 2, characterized in that said piece of equipment is a window or a solid sealed cover.

4. The glove box according to claim 3, wherein a primary attachment of the receiving portion cooperate with tapped holes provided on an inner supporting flange of said docking cylinder, and in that a secondary attachment cooperate with ramps provided on said docking cylinder to facilitate a bayonet type attachment.

5. The glove box according to claim 1, wherein a primary attachment of the receiving portion cooperate with tapped holes provided on an inner supporting flange of said docking cylinder, and in that a secondary attachment cooperate with ramps provided on said docking cylinder, in order to obtain a bayonet type attachment.

6. The glove box according to claim 5, wherein the docking cylinder further comprises a plurality of docking cylinders, each being capable of alternately receiving said powered operation device.

7. The glove box according to claim 1, the docking cylinder further comprises a plurality of docking cylinders, each being capable of alternately receiving said powered operation device.

8. The glove box according to claim 1, wherein said powered operation device is a vacuum cleaner.

9. The glove box according to claim 1, wherein the glove box houses nuclear material.

10. The glove box according to claim 9, wherein nuclear fuel is manufactured within the glove box.

11. The glove box according to claim 1, wherein the receiving portion operates under a negative pressure.

12. The glove box according to claim 1, wherein the contactless drive is magnetic.

13. A method for assembling a powered operation device on a glove box having at least one docking cylinder designed so as to be able to receive a piece of equipment, the method comprising:

introducing said receiving portion of the powered operation device inside said glove box;

mounting a receiving portion on a docking cylinder of said glove box; and mounting on the outside of said glove box a motor part on said docking cylinder, wherein the piece of equipment is held in the docking cylinder in a fixed position and separates the receiving portion and the motor part, and wherein a contactless drive is located between the receiving portion and the motor part.

14. The method of claim 13, further comprising operating the motor portion to cause a drive mechanism within the receiving portion to operate via a contactless interface, wherein the operation of the drive mechanism causes the receiving portion to apply a suction force within the glove box.

15. The method of claim 13, wherein the glove box remains stationary when the powered operation device is in use.

16. A powered operation device comprising:

a glove box having a window separating an enclosed area of the glove box from an exterior area;

a docking cylinder coupled to a first side of the window and located within an enclosed area;

an outer cylindrical portion coupled to a second opposed side of the window and located at the exterior area; and a vacuum device having a receiving portion and a motor portion, the receiving portion coupled to the docking cylinder and located within the enclosed area, the motor portion coupled to the outer cylindrical portion and located in the exterior area, wherein the receiving portion and motor portion having corresponding aligned magnets facing each other at a window interface in a contactless drive configuration, wherein rotation of at least one magnet in the motor portion causes at least one magnet of the receiving portion correspondingly rotate to operate the vacuum device to apply a suction force within the enclosed area of the glove box.

* * * * *

UNITED STATES PATENT AND TRADEMARK OFFICE
CERTIFICATE OF CORRECTION

PATENT NO. : 8,615,843 B2  Page 1 of 1
APPLICATION NO. : 11/793876
DATED : December 31, 2013
INVENTOR(S) : Ladet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1780 days.

Signed and Sealed this
Twenty-second Day of September, 2015

Michelle K. Lee
*Director of the United States Patent and Trademark Office*